United States Patent
Muralidharan

(10) Patent No.: US 6,510,310 B1
(45) Date of Patent: *Jan. 21, 2003

(54) DUAL MODE PHONE ARCHITECTURE UTILIZING A SINGLE TRANSMIT-RECEIVE SWITCH

(75) Inventor: Raghunathan Muralidharan, Irvine, CA (US)

(73) Assignee: Conexant Systems, Inc., Newport Beach, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/013,235

(22) Filed: Jan. 26, 1998

(51) Int. Cl.[7] ................................................ H04B 1/44
(52) U.S. Cl. .......................................... 455/83; 455/553
(58) Field of Search ............................ 455/83, 84, 552, 455/553, 73, 74, 82, 103, 74.1, 131, 80, 81, 78; 370/278, 280, 330, 436; 375/216; 330/175, 176, 185

(56) References Cited

U.S. PATENT DOCUMENTS

| | | | | |
|---|---|---|---|---|
| 5,355,524 A | * | 10/1994 | Higgins, Jr. | 455/82 |
| 5,392,462 A | * | 2/1995 | Komaki | 455/552 |
| 5,815,052 A | * | 9/1998 | Nakajima et al. | 333/175 |
| 5,815,804 A | * | 9/1998 | Newell et al. | 455/83 |
| 5,896,562 A | * | 4/1999 | Heinonen | 455/83 |
| 5,953,641 A | * | 9/1999 | Auvray | 455/553 |
| 6,029,052 A | * | 2/2000 | Isberg et al. | 455/131 |
| 6,078,823 A | * | 6/2000 | Chavez et al. | 455/103 |

* cited by examiner

Primary Examiner—Lester G. Kincaid

(57) ABSTRACT

A dual mode phone system utilizes a single transmit-receive (TR) switch. The dual mode system operates in GSM and DCS communication bands. The use of the single switch reduces the circuit board space required for the telephone hand set. Additionally, the architecture for the telephone reduces receiver losses associated with a diplexer in the receive path.

20 Claims, 3 Drawing Sheets

DUAL MODE PHONE ARCHITECTURE UTILIZING A SINGLE TRANSMIT-RECEIVE SWITCH

FIELD OF THE INVENTION

The present invention relates to dual mode communication systems. More particularly, the present invention relates to a dual band radio frequency (RF) phone architecture which requires only a single transmit-receive switch.

BACKGROUND OF INVENTION

Dual mode or dual band wireless telephones can operate in two different communication bands, such as, a global system for mobile (GSM) communication band or a digital communication service (DCS) communications band. The dual mode telephone or hand set typically includes a switch or control circuit for selecting operation in either the GSM band or DCS band.

The GSM band is between 890 and 960 megahertz (MHz), and the DCS band is between 1,710 and 1,880 MHz. A dual mode telephone operating in the GSM band transmits signals in the 890–915 MHz band and receives signals in the 935–960 MHz band. A dual mode telephone operating in the DCS band transmits signals in the 1,710–1,785 MHz band and receives signals in the 1,805–1,880 MHz band.

Conventional GSM/DCS dual mode phone architectures utilize separate transmit-receive switches for each band. With reference to FIG. 1, a conventional dual mode phone system 10 can include a GSM transmit circuit 12A, a DCS transmit circuit 12B, a GSM receive circuit 14A, a DCS receive circuit 14B, a GSM transmit-receive switch 16A, a DCS transmit-receive switch 16B, a diplexer 18, and an antenna 22. GSM transmit circuit 12A includes a GSM power amplifier 24A, and DCS transmit circuit 12B includes a DCS power amplifier 24B. GSM receive circuit 14A includes a mixer 32A and a GSM filter 34A, and DCS receive circuit 14B includes a DCS filter 34B and a mixer 32B.

In operation, system 10 receives and transmits GSM band signals on GSM path 40A and receives and transmits DCS signals on DCS path 40B. Paths 40A and 40B are in communication with antenna 22 via diplexer 18. Switches 16A and 16B receive transmit signals at an input 42 and provide the transmit signals to a diplexer interface 44. Switches 16A and 16B receive signals at diplexer interface 44 and provide the receive signals to a receive output 46.

Diplexer 18 also allows the simultaneous use of antenna 22 by both GSM and DCS switches 16A and 16B. Diplexer 18 separates GSM signals from DCS signals received from antenna 22 and provides the appropriate signals to paths 40A and 40B. Additionally, diplexer 18 isolates GSM signals on path 40A from DCS signals on path 40B and DCS signals on path 40B from GSM signals on path 40A.

Diplexer 18 can be a filter device having a low pass path coupled to path 40A and a high pass path coupled to path 40B. The high pass path and the low pass path preferably divide the frequency spectrum into two separate frequency bands, such as, the DCS band and the GSM band.

Transmit input 42 of switch 16A is coupled to power amplifier 24A in transmit circuit 12A. Similarly, transmit input 42 of switch 16B is coupled to power amplifier 24B of transmit circuit 12B. Receive output 46 of switch 16A is coupled to filter 34A in receive circuit 14A. Similarly, receive output 46 of switch 16B is coupled to filter 34B of receive circuit 14B. Switches 16A and B perform the basic function of routing the transmit and receive signals associated with paths 40A and B, respectively, to appropriate circuits 12A–B and 14A–B while providing adequate isolation. Switches 16A and B are preferably devices which do not have appreciable loss characteristics.

When in a transmit mode, switches 16A and B couple transmit input 42 to interface 44. When in a receive mode, switches 16A and B couple interface 44 to receive output 46. Switches 16A and B can be controlled by a control circuit or other device which places system 10 in a transmit or receive mode.

Transmit circuits 12A–B and receive circuits 14A–B preferably represent transmit and receive radio units for GSM and DCS bands in system 10. The various components associated with other portions of system 10 are beyond the scope of the general high level architecture associated with switches 16A and B and discussed in the present application.

System 10 is preferably implemented on a printed circuit board. The printed circuit board must be of minimal size in order to accommodate the decreasing size allowances for dual mode phones. Switches 16A and B consume a large portion (e.g., almost a majority) of the circuit board real estate associated with the circuit components shown in FIG. 1. Additionally, switches 16A and B and are expensive. Therefore, conventional switches 16A and B add significantly to the associated monetary and circuit board real estate costs of a dual mode phone design.

Thus, there is a need for a dual band phone architecture which only requires a single transmit-receive switch. Further, there is a need for a GSM/DCS dual mode phone architecture with reduced circuit board space requirements.

SUMMARY OF THE INVENTION

The present invention relates to a dual band phone including an antenna, a transmission path, a receive path, and a single transmit-receive switch. The transmission path includes a first transmit power amplifier and a second transmit power amplifier. The first transmit power amplifier provides transmit signals in a first frequency range, and the second transmit power amplifier provides the transmit signals in a second frequency range. The receive path includes a first filter path for receiving receive signals in a third frequency range and a second filter path for receiving receive signals in a fourth frequency range. The single transmit-receive switch has an antenna interface, a transmit input, and a receive output. The antenna interface is coupled to the antenna, the transmit input is coupled to the transmit path, and the receive output is coupled to the receive path.

The present invention further relates to a dual band phone architecture including a GSM radio transmission unit having a GSM output, a DCS radio transmission unit having a DCS output, at least one receive unit, a diplexer, and a single transmit-receive switch. The diplexer has a first input coupled to the GSM output, a second input coupled to the DCS output, and a diplexer output. The single transmit-receive switch has an antenna interface, a transmit input, and a receive output. The transmit input is coupled to the diplexer output, and the receive output is coupled to the receive unit.

The present invention still further relates to a dual band phone system including an antenna, a transmission path means, a receive path means, and a single transmit-receive switch means. The transmission path means provides transmit signals in a first frequency range and in a second frequency range. The receive path means receives receive signals in a third frequency range and in a fourth frequency range. The single transmit-receive switch means connects the transmission means to an antenna or the receive path means to the antenna.

According to one exemplary aspect of the present invention, a phone architecture utilizes only a single transmit-receive switch. A GSM-DCS diplexer is used to separate GSM and DCS signal paths before the transmit-receive switch. A low pass filter can be used to suppress harmonics in the individual GSM and DCS paths. The transmit-receive switch is preferably broad band enough to cover both GSM and DCS frequency bands and is disposed just before the antenna.

In accordance with another exemplary aspect of the present invention, the GSM and DCS power amplifiers can be switched off, depending upon the mode of operation (GSM mode or DCS mode). The transmit-receive switch preferably operates across the frequency range of 890 to 1880 MHz at a power of 35 dbm at GSM frequency bands and 32 dbm at DCS frequency bands. The transmit-receive switch is a GaAs device having low insertion losses between 0.5 dB to 1 dB in both DCS and GSM bands. In addition to simplifying conductor routing for the dual mode phone, the use of a single switch reduces requirements for both circuit board space and electrical current.

BRIEF DESCRIPTION OF THE DRAWINGS

The invention will hereafter be described with reference to the accompanying drawings, wherein like reference numerals denote like elements in the various drawings, and.

DETAILED DESCRIPTION OF PREFERRED EXEMPLARY EMBODIMENTS

Figure 2:
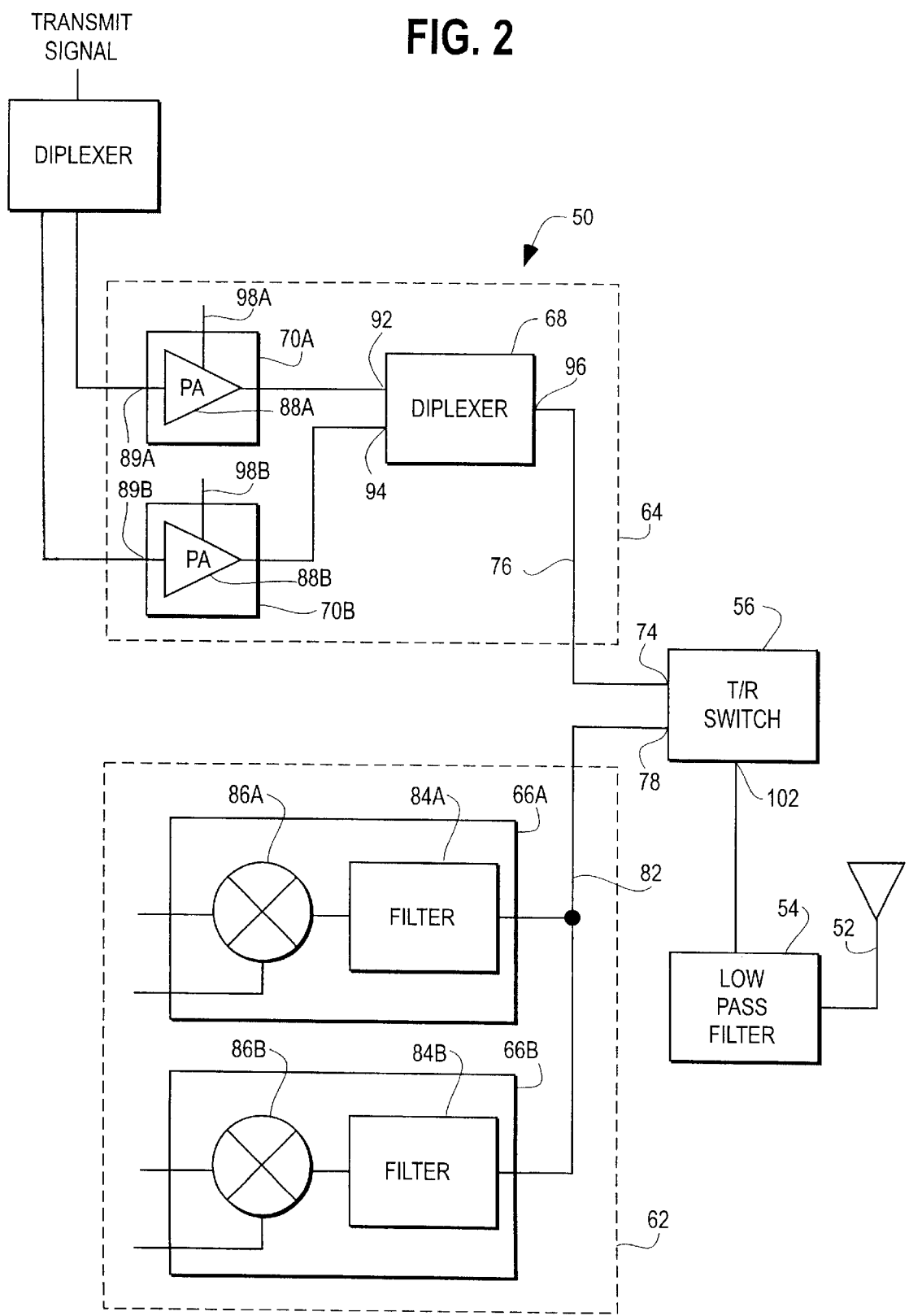
FIG. 2 is a general block diagram of a dual mode telephone architecture in accordance with a preferred exemplary embodiment of the present invention.

With reference to FIG. 2, a dual mode telephone system 50 includes an antenna 52, a low pass filter 54, a transmit-receive switch 56, a receive unit 62, and a transmit unit 64. Receive unit 62 includes a GSM receive circuit 66A and a DCS receive circuit 66B. Transmit unit 64 includes a diplexer 68, a GSM transmit circuit 70A, and a DCS transmit circuit 70B.

Transmit-receive switch 56 has a transmit input 74 coupled to a transmit path 76 of unit 64 and a receive output 78 coupled to a receive path 82 of unit 62. Receive circuit 66A includes a filter 84A and a LNA mixer 86A. Similarly, receive circuit 66B includes a filter 84B and a LNA mixer 86B. Filter 84A is preferably tuned to the GSM band and coupled to path 82. Filter 84B is preferably tuned to the DCS band and coupled to path 82.

Figure 1:
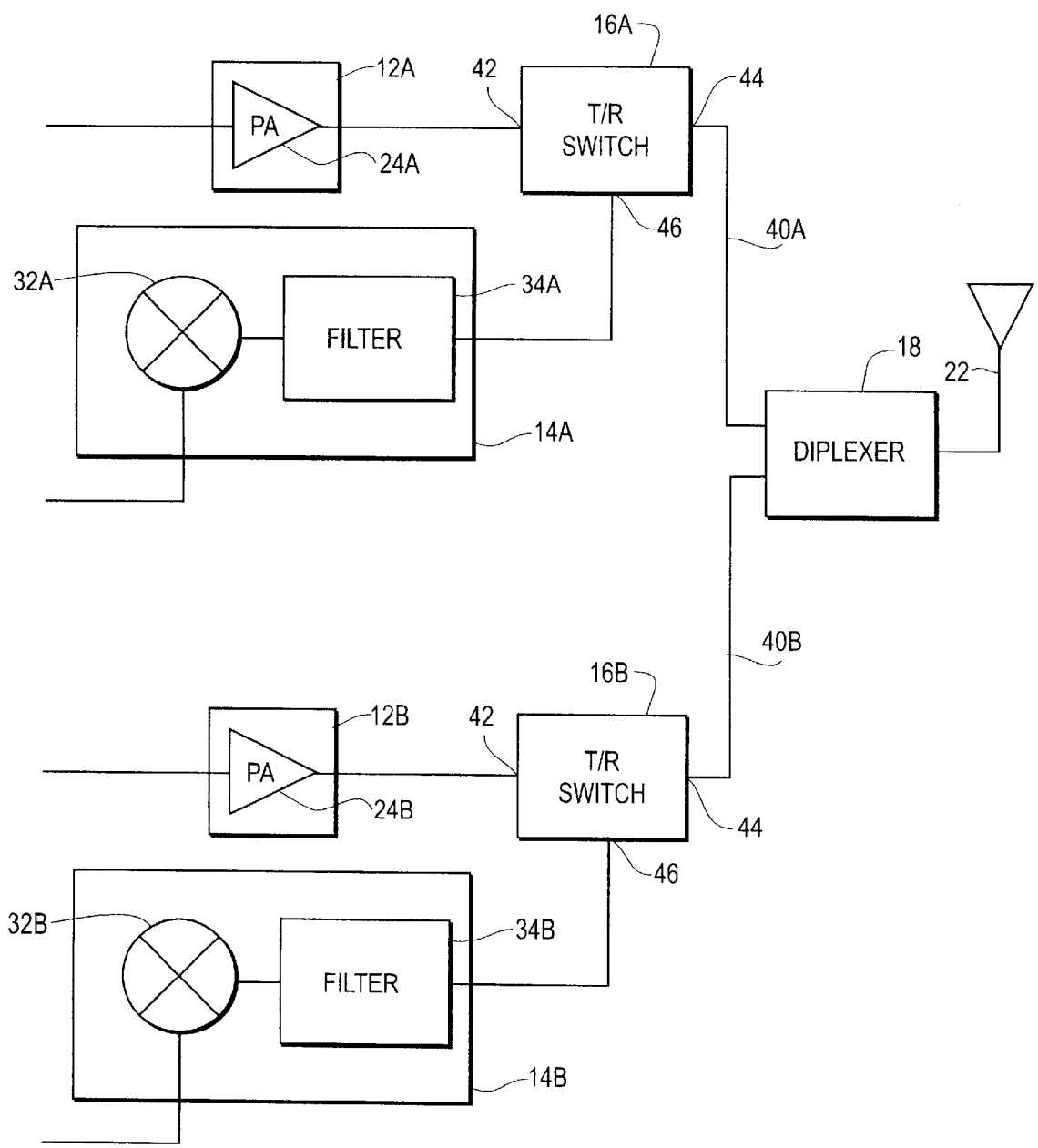
FIG. 1 is a general schematic block diagram of a conventional dual mode telephone system.

Transmit circuit 70A includes a power amplifier 88A, and transmit circuit 70B includes a power amplifier 88B. Diplexer 68 has a GSM input 92 coupled to amplifier 88A and a DCS input 94 coupled to amplifier 88B. Diplexer 68 has an output 96 coupled to transmit path 76. Unlike diplexer 18 (FIG. 1), diplexer 68 does not need to be capable of bi-directional operation since transmit signals only flow from inputs 92 and 94 to output 96. The unidirectional flow through diplexer 68 is due to the placement of switch 56 closer to antenna 52 than switches 16A and 16B are to antenna 22 (FIG. 1).

Amplifier 88A has a control input 98A, and amplifier 88B has a control input 98B. Amplifiers 88A and 88B can be disabled or turned off by providing an appropriate control signal at inputs 98A–B, respectively. The operation of system 50 in a transmit mode and a receive mode are discussed below as follows.

When in a transmit mode, transmit signals are provided to an input 89A of power amplifier 88A or from input 89B of power amplifier 88B, depending upon whether system 50 is in a DCS mode or in a GSM mode. Generally, amplifiers 88A and 88B can receive the transmit signals from a diplexer coupled to inputs 89A and B which separates the transmission signal into the GSM band and the DCS band. After amplification, the transmitted signal is provided to diplexer 68. For example, if in the GSM mode, the control signal at input 98B turns off amplifier 88B, and an amplified transmit signal from circuit 70A is provided to input 92 of diplexer 68. The amplified signal is provided at output 96 to input 74 of transmit-receive switch 56.

Diplexer 68 serves to isolate transmit circuit 70B from the amplified transmit signal at input 92. Conversely, if in the DCS mode, amplifier 88A is turned off, and amplifier 88B provides an amplified transmit signal to input 94. Diplexer 68 isolates circuit 70A from the amplified transmit signal at input 94 and provides the amplified signal at output 96 to transmit path 76.

Figure 3:
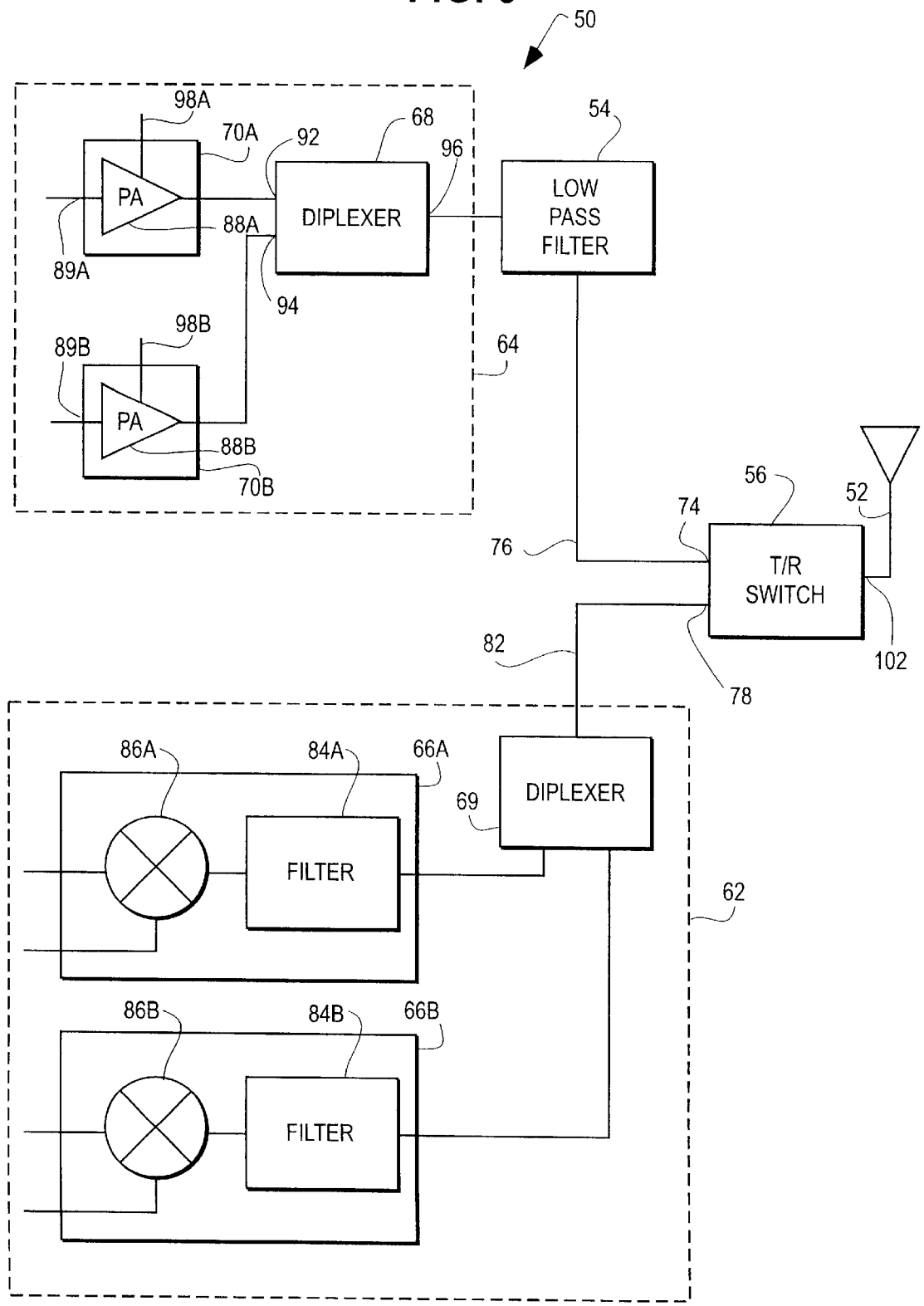
FIG. 3 is a general block diagram of a dual mode telephone architecture in accordance with a variant embodiment of the present invention.

When in the transmit mode, transmit-receive switch 56 provides the transmit signal from path 76 at input 74 to a terminal or antenna interface 102 for eventual reception by antenna 52. The signal at antenna interface 102 is provided through low pass filter 54, which suppresses harmonics associated with system 50. However, if the harmonic performance associated with system 50 is not adequate, filter 54 can be placed between output 96 of diplexer 68 and input 74 of switch 56 as illustrated in FIG. 3. Alternatively, low pass filter 54 can be eliminated. Filter 54 preferably has a threshold greater than 1880 MHz, such as, 1950 MHz.

When in a receive mode, signals are received on antenna 52 and provided to antenna interface 102 through low pass filter 54. In a GSM mode, the GSM receive signals are provided from interface 102 to receive output 78 of switch 56. The GSM receive signals are received by receive circuit 66A via receive path 82. Filter 84A selects the GSM receive signals.

In a DCS mode, DCS signals are received at antenna interface 102 and provided to receive output 78 in the receive mode. The. DCS receive signals at output 78 are received on receive path 82 and provided to receive circuit 66B. Filter 84B selects the DCS receive signals.

Switch 56 is preferably a GaAs device having an operating frequency between 890 to 1880 MHz. Switch 56 is preferably controlled by a control signal having a voltage between 3 and 4.8 volts. Switch 56 preferably can handle 35 dBM power in the GSM band and 32 dBM power in the DCS band. Switch 56 preferably has low insertion losses (e.g., 0.5 dB to 1 dB in both the GSM and the DCS bands). Diplexer 68 is preferably a Murata LFDP 25 device.

The high level architecture described in the present application provides significant performance advantages over conventional dual mode phone system 10 (FIG. 1). For example, system 50 does not have power losses associated with the diplexer, such as, diplexer 18 (FIG. 1), which is in the receive path of system 10. Since transmit-receive switch 56 is placed between diplexer 68 and antenna 52, receive path 82 does not require diplexer 68. However, if steps are taken to compensate for power losses in receive path 82, a diplexer 69 similar to diplexer 18 can be utilized in receive path 82, as illustrated in FIG. 3, to provide isolation between GSM and DCS receive signals. Additionally, system 50 only requires a single transmit-receive switch which reduces the power requirements, expense, circuit board space, and routing requirements.

The present application provides a description of an advantageous high level dual mode phone architecture. Details associated with the base band processing and other components of the high level architecture are beyond the scope of the present application.

It is understood that, while the detailed drawings and specific examples given describe preferred exemplary embodiments of the present invention, they are for the purpose of illustration only. The apparatus and method of the invention is not limited to the precise details and conditions disclosed. For example, although the single transmit-receive switch is described as a GaAs device, other types of transmit-receive switches can be utilized. Various changes may be made to the details disclosed without departing from the spirit of the invention, which is defined by the following claims.

What is claimed is:

1. A dual band phone, comprising:
   an antenna:
   a transmission path including a first transmit power amplifier and a second transmit power amplifier, the first transmit power amplifier providing transmit signals in a first frequency range and the second transmit power amplifier providing transmit signals in a second frequency range:
      a first diplexer which receives transmission signals and provides the transmission path with separated transmission signals in the first frequency range to the first transmit amplifier and separated transmission signals in the second frequency range to the second power amplifier;
   a receive path including a first filter for receiving receive signals in a third frequency range and a second filter for receiving receive signals in a fourth frequency range;
   a first LNA mixer coupled directly to an output of the first filter;
   a second LNA mixer coupled directly to an output of the second filter; and
   a single GaAs transmit-receive switch having a single antenna interface, a transmit input, and a receive output, the antenna interface being coupled to the antenna, the transmit input being coupled to the transmit path, and the receive output being coupled directly to the first and second filters of the receive path, said antenna, transmission path, receive path, and single transmit-receive switch being adapted to allow the dual band phone to operate on GSM and DCS communication bands wherein the transmission path and receive path are used one at a time, the transmission path is used to transmit within one of the first and second frequency ranges and the receive path is used to receive on one of the third and fourth frequency ranges, and wherein the first, second, third and fourth frequency ranges are all different.

2. The dual band phone of claim 1, wherein the first and third ranges are in a global system for mobile (GSM) band, and the second and fourth ranges are in a digital communication service (DCS) band.

3. The dual band phone of claim 1, further comprising:
   a low pass filter coupled between the antenna interface and the antenna.

4. The dual band phone of claim 1, wherein the transmit path further comprises: a second diplexer coupled between the transmit input and the first and second power amplifiers.

5. The dual band phone of claim 4, further comprising: a low pass filter coupled between the second diplexer and the transmit input.

6. The dual band phone of claim 4, wherein the first transmit power amplifier is suppressed in a second mode of operation.

7. The dual band phone of claim 6, wherein the second transmit power amplifier is suppressed in a first mode of operation.

8. The dual band phone of claim 4, wherein the switch is a GaAs semiconductor device.

9. A dual band phone architecture, comprising:
   a GSM radio transmission unit having a GSM output;
   a DCS radio transmission unit having a DCS output;
   a first diplexer which separates a transmission signal into a GSM band and a DCS band and which provides a transmit signal to the GSM radio transmission unit and a transmit signal to the DCS radio transmission unit;
   at least one receive unit:
      a second diplexer having a first input coupled to the GSM output, a second input coupled to the DCS output, and a diplexer output;
      a single GaAs transmit-receive switch having a single antenna interface, a transmit input, and a receive output, the transmit input being coupled directly to the diplexer output, and the receive output being coupled directly to the receive unit, said single transmit-receive switch being adapted to allow one of the GSM radio transmission unit and DCS radio transmission to transmit and the at least one receive unit to receive, but not at the same time;
      the receive unit further comprising a receive filter coupled directly to the receive output: and
      a LNA mixer coupled directly to an output of the filter.

10. The dual band phone architecture of claim 9, wherein the GSM output provides signals between 890 and 915 MHz.

11. The dual band phone architecture of claim 10, wherein the DCS output provides signals between 1710 and 1785 MHz.

12. The dual band phone architecture of claim 11, wherein the receive unit further comprises: a third diplexer.

13. The dual band phone architecture of claim 12, wherein the switch includes a GaAs substrate.

14. The dual band phone architecture of claim 9, further comprising:
    a low pass filter coupled to the antenna interface.

15. The dual band phone architecture of claim 9, further comprising: a low pass filter coupled between the second diplexer and the transmit input.

16. The dual band phone architecture of claim 9, wherein the GSM transmission unit is suppressed in a DCS mode of operation, and wherein the DCS transmission unit is suppressed in a GSM mode of operation.

17. A dual band phone system, comprising:
    an antenna;
    a diplexer which receives and separates a transmission signal into a first frequency range and a second frequency range;
    a transmission path means coupled to an output of the diplexer for providing transmit signals in the first frequency range and for providing transmit signals in the second frequency range;

a receive path means for receiving receive signals in a third frequency range and for receiving receive signals in a fourth frequency range; and a single GaAs transmit-receive switch means for connecting the transmission path means to a single antenna or for connecting the receive path means to the single antenna, said antenna, transmission path means, receive path means, and single transmit-receive switch means being adapted to allow the dual band phone to operate on GSM and DCS communication bands wherein the transmission path means and receive path means operate one at a time, the transmission path means is used to transmit on one of the first and second frequency ranges, the receive path means is used to receive on one of the third and fourth frequency ranges, and the first, second, third and fourth frequency ranges are all different, the receive path means further comprising:

a filter directly coupled to the receive path means; and a LNA mixer directly coupled to an output of the filter.

18. The dual band phone system of claim 17, further comprising:

a low pass filter coupled between the switch means and the antenna.

19. The dual band phone system of claim 18, wherein the switch means is a GaAs device.

20. The dual band phone system of claim 17, wherein the third range is between 1805–1880 MHz, and the fourth range is between 935–960 MHz.

* * * * *